United States Patent
Flory et al.

(10) Patent No.: US 8,912,297 B2
(45) Date of Patent: Dec. 16, 2014

(54) LOW DENSITY POLYETHYLENE WITH LOW DISSIPATION FACTOR AND PROCESS FOR PRODUCING SAME

(75) Inventors: Anny Flory, South Plainfield, NJ (US); Michael L. Smith, Lake Jackson, TX (US); Chester J. Kmiec, Phillipsburg, NJ (US); Robert F. Eaton, Belle Mead, NJ (US); Alfred E. Vigil, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/124,073

(22) PCT Filed: Mar. 8, 2012

(86) PCT No.: PCT/US2012/028276
§ 371 (c)(1),
(2), (4) Date: Dec. 5, 2013

(87) PCT Pub. No.: WO2012/177299
PCT Pub. Date: Dec. 27, 2012

(65) Prior Publication Data
US 2014/0187730 A1    Jul. 3, 2014

Related U.S. Application Data

(60) Provisional application No. 61/500,315, filed on Jun. 23, 2011.

(51) Int. Cl.
| | | |
|---|---|---|
| C08F 2/04 | (2006.01) |
| C08F 2/38 | (2006.01) |
| C08F 110/02 | (2006.01) |
| B01J 19/18 | (2006.01) |

(52) U.S. Cl.
CPC .................................. *C08F 110/02* (2013.01)
USPC ............. 526/68; 526/67; 526/352.2; 521/143

(58) Field of Classification Search
USPC ............................ 526/67, 68, 352.2; 521/143
See application file for complete search history.

(56) References Cited

U.S. PATENT DOCUMENTS

| | | | |
|---|---|---|---|
| 4,547,328 A | 10/1985 | Yuto et al. | |
| 6,130,385 A | 10/2000 | Tuunanen et al. | |
| 6,455,602 B1 | 9/2002 | Maki et al. | |
| 7,582,709 B2 * | 9/2009 | Goossens et al. | 526/64 |
| 2003/0114607 A1 | 6/2003 | Donck | |
| 2012/0252990 A1 * | 10/2012 | Berbee et al. | 526/64 |

* cited by examiner

*Primary Examiner* — Fred M Teskin
(74) *Attorney, Agent, or Firm* — Whyte Hirschboeck Dudek S.C.

(57) ABSTRACT

The present disclosure provides a process for producing low density polyethylene with a dissipation factor less than or equal to $1.48 \times 10^{-4}$ radian at 2.47 GHz. The process includes free radical high pressure polymerization of ethylene and separation of the unreacted species from the resultant polyethylene to form a recycle stream. The process further includes purging dissipative components from the recycle stream. The purged recycle stream is then introduced into the polymerization reactor.

10 Claims, No Drawings

LOW DENSITY POLYETHYLENE WITH LOW DISSIPATION FACTOR AND PROCESS FOR PRODUCING SAME

CROSS REFERENCE TO RELATED APPLICATION

The present application is the national phase of PCT Patent Application No. PCT/US2012/018276 filed Mar. 8, 2012, which claims priority to U.S. Provisional Application No. 61/500,315, filed Jun. 23, 2011, the entire content of which is incorporated by reference herein.

BACKGROUND

It is known to insulate a conductor with a polymeric composition such as low density polyethylene (LDPE). For example, foamed LDPE, alone or blended with another polymer, is routinely used to insulate communication cable, such as coaxial cable and/or radio frequency cable.

Rapid advancements in the telecommunication industry are placing greater demand for higher signal quality in communication cable. One way to obtain higher signal quality in communication cable is to lower signal attenuation. It is known that impurities, polar functional groups and/or unsaturation present in the polyethylene can negatively affect the dielectric properties and increase the dissipation factor. Thus, the art recognizes the need for polyethylene with low amounts of impurities, polar groups and unsaturation in order to achieve lower signal attenuation and lower dissipation factor in cable insulation. The art further recognizes the need for an LDPE electrical insulation material with a low dissipation factor that does not compromise the physical properties and/or processability properties of the LDPE.

SUMMARY

The present disclosure is directed to a low density polyethylene composition with an improved (i.e., lower) dissipation factor and a process for producing same. Applicant has discovered a process that produces an LDPE composition with a reduced amount of dissipative components. The reduced amount of dissipative components yields an LDPE with a low dissipation factor (i.e., less than or equal to $1.48 \times 10^{-4}$ radian at 2.47 GHz) while simultaneously maintaining the physical and processability properties of the LDPE. Cable insulation made with the low dissipation factor LDPE of the present disclosure advantageously exhibits low signal attenuation.

The present disclosure provides a process. In an embodiment, a process for producing a polyethylene composition includes contacting, in a polymerization reactor under high pressure polymerization conditions, ethylene with a free radical initiator in the presence of a solvent. The reaction forms a reactor effluent comprising a high pressure low density polyethylene (HP-LDPE) and unreacted species. The process includes separating the unreacted species from the HP-LDPE to form a recycle stream and purging dissipative components from the recycle stream to form a purged recycle stream. The process further includes introducing the purged recycle stream into the polymerization reactor and forming a HP-LDPE having a dissipation factor less than or equal to $1.48 \times 10^{-4}$ radian at 2.47 GHz.

The present disclosure provides a polymeric composition. In an embodiment, the polymeric composition includes an HP-LDPE. The HP-LDPE is produced by the present process. The HP-LDPE exhibits one, some, all, or any combination of the following properties:

(i) a carbonyl ratio less than or equal to 0.05;
(ii) a hydroxyl ratio less than or equal to 0.37;
(iii) a vinylidene ratio less than or equal to 0.19;
(iv) a vinyl ratio less than or equal to 0.03; and
(v) a dissipation factor less than or equal to $1.48 \times 10^{-4}$ radian at 2.47 GHz.

The present disclosure provides another composition. In an embodiment, a foam composition is provided. The foam is a blend of (A) the HP-LDPE and (B) high density polyethylene (HDPE). The blend is expanded to a foam. The HP-LDPE component of the foam composition has one, some, all, or any combination of the following properties prior to expansion:

(i) a carbonyl ratio less than or equal to 0.05;
(ii) a hydroxyl ratio less than or equal to 0.37;
(iii) a vinylidene ratio less than or equal to 0.19;
(iv) a vinyl ratio less than or equal to 0.03; and
(v) a dissipation factor less than or equal to $1.48 \times 10^{-4}$ radian at 2.47 GHz.

The present disclosure provides a coated conductor. In an embodiment, the coated conductor includes a conductor and a coating on the conductor. The coating is composed of a blend of (A) the HP-LDPE and (B) HDPE. The blend of the coating is expanded to form a foam composition. The HP-LDPE component of the foam composition has one, some, all, or any combination of the following properties prior to expansion:

(i) a carbonyl ratio less than or equal to 0.05;
(ii) a hydroxyl ratio less than or equal to 0.37;
(iii) a vinylidene ratio less than or equal to 0.19;
(iv) a vinyl ratio less than or equal to 0.03; and
(v) a dissipation factor less than or equal to $1.48 \times 10^{-4}$ radian at 2.47 GHz.

DETAILED DESCRIPTION

1. Process

The present disclosure provides a process. In an embodiment, a process for producing a low density polyethylene includes contacting, in a polymerization reactor under high pressure polymerization conditions, ethylene with a free radical initiator in the presence of a solvent to form a reactor effluent. The reactor effluent contains a high pressure low density polyethylene (HP-LDPE) and unreacted species. The process includes separating the unreacted species from the HP-LDPE to form a recycle stream. The process includes purging dissipative components from the recycle stream and introducing a purged recycle stream into the polymerization reactor. The process includes forming a HP-LDPE having a dissipation factor less than or equal to $1.48 \times 10^{-4}$ radian at 2.47 GHz.

As used herein, "reaction conditions," are temperature, pressure, reactant concentrations, solvent selection, chain transfer agent (CTA), reactant mixing/addition parameters, and other conditions within a polymerization reactor that promote reaction between the reagents and formation of the resultant product, namely LDPE. The term "high pressure polymerization conditions," as used herein, are reaction conditions that include 15,000 to 50,000 pounds per square inch gauge (psig) (1021-3403 atmosphere (atm)) of pressure and a reaction temperature from 150° C. to 350° C. to promote free radical polymerization of the ethylene.

High pressure polymerization of ethylene is typically conducted in a tubular reactor, in a stirred autoclave, or a combination of a tubular reactor and a stirred autoclave. Nonlimiting examples of suitable high pressure polymerization reactors include a single autoclave or multiple autoclaves, a combination of one or more autoclaves and a tubular reactor operating in series or in sequential order, or a single tubular reactor. The reactor series order may consist of an autoclave reactor followed by a tubular reactor. Furthermore, the autoclave reactor may have one or more reactor zones. Each of the reactor zones may have independent feed of ethylene, optional comonomers, free radical initiators, catalyst, and CTAs. In addition, the tubular reactor may have one or more feed points along the length of the tubular reactor to allow independent feed of ethylene optional comonomers, free radical initiators, catalysts, and CTAs.

The present process may be performed using a continuous process or a batch process. The ethylene monomer (and optional comonomer(s)) may be fed into the polymerization reactor entirely in the beginning or at the front or may be parsed and fed into the reactor at several different locations (for a continuous-type process) during the reaction cycle.

When a stirred autoclave reactor is employed, the pressure can be in the range of from 1,000 to 4,000 bar absolute ("bara") (100 to 400 megapascals absolute ("MPaa")), or from 2,000 to 3,000 bara (200 to 300 MPaa), and the temperature can be in the range from 120° C. to 340° C.

When a tubular reactor is employed, the pressure can be in the range from 1,000 to 4,000 bara (100 to 400 MPaa) and the temperature can be in the range from 120° C. to 360° C. Polymerization in a tubular reactor under high pressure polymerization conditions occurs in turbulent process fluid flow. At certain points along the tube, a portion of the heat produced during the free-radical polymerization may be removed through the tube wall.

In an embodiment, the reaction temperature for at least a portion of the polymerization is from 200° C., or 225° C., or 250° C. to 360° C. In a further embodiment, the reaction temperature is held for at least 25% of the polymerization, or at least 50% of the polymerization, at least 75% of the polymerization, or during the entire polymerization process.

In an embodiment, the present process is performed in a multi-reactor system including a first reactor that is an autoclave reactor and a second reactor that is a tubular reactor. The first (autoclave) reactor has one, two, or more reaction zones. The temperature in each reactor zone is the same or different and is from 180° C., or 200° C., or 230° C., or 239° C. to 245° C., or 250° C., or 280° C., or 360° C. The pressure in each reactor zone of the first reactor is the same or different and is from 22,000 psig, or 24,000 psig to 27,000 psig, or 33,000 psig.

The second reactor of the multi-reactor system is a tubular reactor. The second (tubular) reactor has one, two, or more reactor zones. The temperature in each tubular reactor zone is the same or different and is from 180° C., or 240° C. to 280° C., or 290° C. The pressure in each tubular reactor zone is the same or different and is from 22,000 psig, or 24,000 psig to 27,000 psig, or 33,000 psig.

Suitable free-radical initiators include, but are not limited to, oxygen-based initiators such as organic peroxides ("PO"), peroxyesters, dialkyl peroxides, and combinations thereof. Nonlimiting examples of suitable free radical initiators include t-butyl peroxy pivalate, di-t-butyl peroxide (DTBP), t-butyl peroxy acetate (TBPO), t-butyl peroxy-2-ethylhexanoate, t-butyl peroxy neodecanoate (PND), t-butyl-peroxy-octoate, and any combination thereof. The free-radical polymerization reaction occurs in each reaction zone where initiator or catalyst is present. The reaction is an exothermic reaction that generates a large quantity of heat.

In an embodiment, the contacting step is performed in the presence of a chain transfer agent that is a saturated hydrocarbon. After hydrogen atom donation, the CTA may form a radical which can react with a monomer, an oligomer, or a comonomer, and start a new polymer chain. The result is that the original CTA is incorporated into a new or existing polymer chain, thereby introducing a new functionality into the polymer chain associated with the original CTA. The CTA may introduce new functionality into the polymer chain that is not normally the result of the monomer/comonomer polymerization.

In an embodiment, two or more chain transfer agents may be used. At least one of the chain transfer agents may be an alpha-olefin. Other optional components that may be fed to the polymerization reactor to initiate and support the free-radical reaction include reaction initiators and catalysts.

In an embodiment, a single CTA is used. The single CTA is a saturated hydrocarbon. The CTA is isobutane. The CTA is present during the polymerization in an amount from 0.05 wt %, or 0.1 wt % to 0.2 wt %, or 0.5 wt %, with wt % based on the combined weight of the CTA, the ethylene monomer and any optional comonomer (if present).

The solvent is a liquid (at ambient conditions). The solvent serves as a free radical initiator solvent, a balance for pump flow, and combinations thereof. In an embodiment, the solvent is a non-polar isoparaffin fluid solvent. A nonlimiting example of a suitable isoparaffin fluid solvent is Isopar™ H. The present process uses non-polar isoparaffin fluid solvent as a replacement for conventional flow balance polar alkanols such as isopropanol, butanol, t-butanol, and any combination thereof. Applicant discovered the isoparaffin fluid solvent advantageously contributes to the reduction of dissipative components present in the recycle stream.

The process includes high pressure free radical polymerization of ethylene which forms a reactor effluent. The reactor effluent includes a high pressure low density polyethylene (HP-LDPE) and unreacted species. The unreacted species include one, some, or all of the following: solvent, unreacted monomer (ethylene), unreacted optional comonomer, unreacted free radical initiator, unreacted CTA, unreacted catalyst (optional), free radical initiator decomposition products (such as acetone and tert-butanol), impurities from feed systems, lubricants used in machinery, and any combination thereof. The unreacted species typically include ethylene in a majority amount (greater than 95 wt %, or greater than 97 wt % of the total weight unreacted species) with the other components present in a combined amount from less than 5 wt % or less than 3 wt % (based on total weight unreacted species).

The process includes separating the unreacted species from the HP-LDPE to form a recycle stream. The term "recycle stream," as used herein, is the excess unreacted species retrieved during the primary separation phase. The unreacted species are retrieved during a primary separation phase which reduces the pressure of the first polymerization reactor (high pressure recycle stream) to about 3000 psig and subsequently reduces the pressure to about ambient pressure (low pressure recycle stream) in a subsequent vessel or separator. The separated gases are collected to form to the recycle stream. A portion of the recycle stream is introduced into the polymerization reactor to improve the monomer efficiency of production units as will be discussed below.

The process includes purging dissipative components from the recycle stream. The term "purge," as used herein, is the act of removing one or more dissipative component(s) from the recycle stream. Purge (or purging) is performed by diverting or otherwise discarding a portion (or a fraction) of the unreacted species from the recycle stream. In other words, purging is drawing or otherwise removing a portion of the unreacted species (a "purge stream") from the recycle stream.

The purging step forms a purged recycle stream. A "purged recycle stream," as used herein, is the recycle stream that has been subjected to the purge procedure. The purged recycle stream has had a portion of the unreacted species removed therefrom (vis-à-vis the purge procedure).

As used herein, the term "dissipative component," and like terms, are polar compounds, unsaturated compounds, and combinations thereof, present in the unreacted species that negatively affect the dielectric properties of the HP-LDPE.

Nonlimiting examples of dissipative components are compounds and/or molecules that contain one or more of the following: a carbonyl group, a hydroxyl group, a vinyl group, a vinylidene group, a trans-vinylidene group, and any combination thereof. Further nonlimiting examples of dissipative components include acetone, tert-butanol, carbon dioxide, ketones, alcohols, carboxylic acids, hypercompressor oil, mineral oil, polar anti-oxidant, polyalkylene glycol, and any combination thereof. Bounded by no particular theory, dissipative components may be the result of reactor/reagent impurities, peroxide decomposition products, additives such as antioxidants, outside contaminants such as dust or fibers from packaging, and any combination of the foregoing.

In an embodiment, the purging step includes maintaining, during the contacting step (during polymerization), a purge fraction from 0.18 to 0.6. The "purge fraction" is defined by Equation (1) below:

$$\text{Purge fraction} = \frac{\text{purge stream flow rate(lbs/hr)}}{\text{recycle stream flow rate(lbs/hr)}} \quad (1)$$

In an embodiment, the purge fraction is from 0.18, or 0.26 to 0.4, or 0.6.

The recycle stream flow rate is measured by flow measurement using pressure drop and temperatures as is standard for gas flow measurement. The recycle stream flow rate is determined by way of a volumetric displacement compressor. The volumetric displacement compressor displaces a specific volume of fluid. The density of the fluid is estimated with the operating pressure (measured) and temperature (measured). The density and the volume displaced are then used to calculate the mass flow rate for the recycle stream. The purge stream flow rate is determined in a similar manner.

The process includes introducing the purged recycle stream into the polymerization reactor. The purge stream is diverted from the recycle stream. The purge stream is not introduced in the polymerization reaction. The purge stream is removed from the polymerization process. The process further includes forming a HP-LDPE having dissipation factor less than or equal to $1.48 \times 10^{-4}$ radian at 2.47 GHz.

The term "high pressure low density polyethylene" or "HP-LDPE," as used herein, is low density ethylene homopolymer with a density from 0.910 g/cc to 0.940 g/cc produced by way of free radical polymerization under high pressure.

HP-LDPE is distinct from other types of polyethylenes. The present HP-LDPE is free radical polymerized and is distinct from organo-metallic catalyzed polyethylene such as metallocene, constrained geometry, and/or Ziegler-Natta catalyzed polyethylene. In particular, HP-LDPE is distinct from linear low density polyethylene (LLDPE). LLDPE has a linear molecular structure with a very narrow molecular weight distribution (MWD). In contrast, HP-LDPE resins have a long chain branched structure and a broader MWD compared to LLDPE.

HP-LDPE is distinct from high density polyethylene (HDPE). "HDPE" is an ethylene-based polymer (ethylene homopolymer or ethylene copolymer) that has a density greater than 0.940 g/cc. The melt viscosity of HP-LDPE in elongational flow is strain hardening. This means that as the HP-LDPE melt is stretched, its elongational viscosity will increase with increasing elongation rate. In contrast, LLDPE and HDPE exhibit tension thinning whereby the elongational viscosity drops with increasing extension rate and the extrudate is readily drawn into very thin sections. Further differences between HDPE and HP-LDPE and are provided in Table 1 below.

TABLE 1

Differences between HDPE and HP-LDPE

| Property | HDPE | HP-LDPE |
|---|---|---|
| $T_g$ ° C. (° F.) | −120 (−184) | −120 (−184) |
| $T_m$ ° C. (° F.) | 128-138 (262-280) | 105-115 (221-239) |
| Density, $g/cm^3$ ($lb/ft^3$) | 0.940-0.965 (58.7-60.2) | 0.912-0.925 (56.9-57.7) |
| Tensile strength, MPa (psi) | 17.3-44.8 (2500-6500) | 8.2-31.4 (1200-4550) |
| Tensile Modulus, MPa ($10^3$ psi) | 620-1089 (89.9-158) | 172-517 (24.9-75) |
| Elongation at break, % | 10-1200 | 100-965 |
| Tear strength, g/25 μm (lb/mil), film | 20-60 (0.04-0.13) | 200-300 (0.4-0.7) |
| *WVTR, g μm/$m^2$ day at 37.8° C., 90% RH (g mil/100 $in^2$ 24 h at 100° F., 90% RH) | 125 (0.32) | 375-500 (0.95-1.3) |
| $O_2$ permeability, 20° C., $10^4$ $cm^3$ μm/$m^2$ day atm (77° F., $cm^3$ mil/100 $in^2$ 24 h atm) | 4.0-7.3 (100-185) | 16.3-21.3 (400-540) |
| $CO_2$ permeability, 25° C., $10^4$ $cm^3$ μm/$m^2$ day atm (77° F., $cm^3$ mil/100 $in^2$ 24 h atm) | 20-25 (500-640) | 75-106 (1900-2700) |
| Water absorption, %, .32 cm/125 mil) thick, 24 h | <0.01 | <0.01 |

*WVTR = Water Vapor Transmission Rate

In an embodiment, the process includes mixing the free radical initiator with an isoparaffin fluid solvent. The isoparaffin fluid solvent is non-polar. The mixing may occur before, during, or after introduction of the free radical initiator into the polymerization reactor. The free radical initiator may be mixed with from 10 wt %, or 15 wt % to 18 wt %, or 20 wt %, or 24 wt %, or 25 wt %, or 30 wt % isoparaffin fluid solvent. In a further embodiment, the isoparaffin fluid solvent mixed with the free radical initiator is Isopar™ H. Weight percent is based on the total weight of the free radical initiator/isoparaffin fluid blend.

In an embodiment, the process includes forming an HP-LDPE having a carbonyl ratio less than or equal to 0.05.

In an embodiment, the process includes forming an HP-LDPE having a hydroxyl ratio less than or equal to 0.37.

In an embodiment, the process includes forming an HP-LDPE having a vinylidene ratio less than or equal to 0.19.

In an embodiment, the process includes forming an HP-LDPE comprising less than 0.03 vinyl groups.

Carbonyl formation in the HP-LDPE backbone occurs primarily from the peroxide decomposition products formed during polymerization. The peroxide decomposition products form chemically active species that can incorporate into the polymer backbone as a carbonyl group. The amount of fresh peroxide fed to the reactor has an effect on the carbonyl concentration within the HP-LDPE polymer back-bone. As used herein, the term "fresh" refers to the initial introduction of a component into the polymerization reactor. A "fresh" component excludes a recycled component.

The present process utilizes less peroxide during free radical polymerization of ethylene. By using less peroxide, the present process advantageously reduces the concentration of oxygen-containing species introduced in the polymerization reactor.

In an embodiment, the process includes maintaining, during the contacting step (during polymerization), a peroxide efficiency ratio from 1800 to 2400. The term "peroxide efficiency ratio" is defined by Equation (2) as follows:

$$\text{peroxide efficiency ratio} = \frac{\text{HP-LDPE production rate(lbs/hr)}}{\text{fresh peroxide solution feed rate(lbs/hr)}} \quad (2)$$

In an embodiment, the peroxide efficiency ratio is from 1800, or 2000 to 2200, or 2400. An increase in peroxide efficiency ratio indicates a reduced peroxide feed rate into the reactor.

The HP-LDPE production rate is measured by a mass flow measuring instrument as known in the art. The fresh peroxide solution feed rate is determined by measuring the volumetric flow rate from the peroxide pump and knowing the composition of the peroxide solution.

In an embodiment, the process includes performing the contacting in a multi-reactor system. The multi-reactor system includes a first reactor that is a stirred autoclave reactor and a second reactor that is a tubular reactor. The temperature of the first reactor is from 230° C. to 250° C., the pressure of the first reactor is from 24,000 psig to 27,000 psig. The process further includes:
  separating the unreacted species from the HP-LDPE to form a recycle stream;
  purging dissipative components from the recycle stream;
  introducing the purged recycle stream into the polymerization reactor;
  maintaining a purge fraction of from 0.18 to 0.60;
  maintaining a peroxide efficiency ratio from 1800 to 2400; and
  forming HP-LDPE having one, some, or all of the following properties:
    (i) a carbonyl ratio less than or equal to 0.05;
    (ii) a hydroxyl ratio less than or equal to 0.37;
    (iii) a vinylidene ratio less than or equal to 0.20;
    (iv) less than or equal to 0.05 vinyl groups; and
    (v) a dissipation factor less than or equal to $1.48 \times 10^{-4}$ radian at 2.47 GHz.

Applicant discovered a polymerization process wherein dissipative components can be monitored, detected, and removed to exceptionally low levels. Bounded by no particular theory, the present process surprisingly reduces the amount of dissipative components present in the reactor by increasing the purge fraction alone or in combination with increasing the peroxide efficiency ratio. This reduction of dissipative components in the reactor feed process directly improves (lowers) the dissipation factor in the resultant HP-LDPE. Applicant has unexpectedly discovered that the present process improves (i.e., lowers) the dissipation factor for HP-LDPE in the frequency range of 100-2470 megahertz (MHz) from 20%, or 30% to 40%, or 50%, when compared to HP-LDPE, or LDPE produced by conventional procedures.

The present process may comprise two or more embodiments discloses herein.

2. Polymeric Composition

The present disclosure provides a composition. In an embodiment, a polymeric composition is provided and includes an HP-LDPE. The HP-LDPE is produced by any of the foregoing processes. The HP-LDPE exhibits one, some, or all or any combination of the following properties:
  (i) a carbonyl ratio less than or equal to 0.05;
  (ii) a hydroxyl ratio less than or equal to 0.37;
  (iii) a vinylidene ratio less than or equal to 0.19;
  (iv) a vinyl ratio less than or equal to 0.03; and
  (v) a dissipation factor less than or equal to $1.48 \times 10^{-4}$ radian at 2.47 GHz.

In an embodiment, the present HP-LDPE has a density from 0.910 g/cc to 0.930 g/cc.

In an embodiment, the present HP-LDPE has a melt index from 1.5 to 10.5 and an MWD from 5 to 12.

In an embodiment, the polymeric composition includes an HP-LDPE having a melt index from 2.0 g/10 min to 3.0 g/10 min and a MWD from 5.0 to 6.0.

In an embodiment, the polymeric composition includes an HP-LDPE having a melt index from 5.5 to 6.5 and an MWD from 11.0 to 12.0.

The present HP-LDPE advantageously contains a surprisingly low amount of dissipative components which yields the low dissipation factor of less than or equal to $1.48 \times 10^{-4}$ radian at 2.47 GHz.

In an embodiment, the HP-LDPE composition has a carbonyl ratio less than or equal to 0.05, or from 0.02 to 0.04, or 0.05.

In an embodiment, the HP-LDPE contains has a vinylidene ratio less than or equal to 0.19, or from 0.17 to 0.19.

In an embodiment, the HP-LDPE a vinyl ratio less than or equal to 0.03.

In an embodiment, the HP-LDPE composition has a hydroxyl ratio less than or equal to 0.37, or from 0.34 to 0.35 or 0.37.

The present polymeric composition may comprise two or more embodiments disclosed herein.

A. Blend

In an embodiment, the polymeric composition is a blend of (A) the foregoing HP-LDPE and (B) a polyolefin. Nonlimiting examples of suitable polyolefins include propylene-based polymer and ethylene-based polymer.

In an embodiment, the HP-LDPE of the blend has one, some, all, or any combination of the following properties:
  (i) a carbonyl ratio less than or equal to 0.05;
  (ii) a hydroxyl ratio less than or equal to 0.37;
  (iii) a vinylidene ratio less than or equal to 0.19;
  (iv) a vinyl ratio less than or equal to 0.03; and
  (v) a dissipation factor less than or equal to $1.48 \times 10^{-4}$ radian at 2.47 GHz.

In an embodiment, the polyolefin present in the blend is a high density polyethylene (HDPE). The blend contains 20 wt % to 80 wt % HDPE and from 80 wt % to 20 wt % HP-LDPE. Weight percent is based on total weight of the blend.

In an embodiment, the polymeric composition is a blend containing 50 wt % HDPE, 50 wt % HP-LDPE and the blend has a density from 0.935 g/cm$^3$ to 0.945 g/cm$^3$.

In an embodiment, the polymeric composition is a blend containing 50 wt % HDPE, 50 wt % HP-LDPE and the blend has a dissipation factor less than or equal to $1.0 \times 10^{-4}$ radian at 2.47 GHz.

In an embodiment, the polymeric composition is a blend containing 50 wt % HDPE, 50 wt % HP-LDPE and the blend has a melt index of 6.89 g/10 min.

B. Foam Composition

The present disclosure provides another composition. In an embodiment, a foam composition is provided and includes a blend of (A) the HP-LDPE and (B) HDPE, the blend expanded to a foam. The foam composition has a uniform cell distribution with cells that fall in the range from 1 micron to 100 microns. Expansion of the blend into a foam can be accomplished by chemical foaming agents or by physical gas injection into an extruder during a coated conductor (insulated wire) production process.

The HP-LDPE component of the foam composition is any HP-LDPE as disclosed herein and has one, some, all, or any combination of the following properties prior to expansion:
(i) a carbonyl ratio less than or equal to 0.05;
(ii) a hydroxyl ratio less than or equal to 0.37;
(iii) a vinylidene ratio less than or equal to 0.19;
(iv) a vinyl ratio less than or equal to 0.03; and
(v) a dissipation factor less than or equal to $1.48 \times 10^{-4}$ radian at 2.47 GHz.

C. Coated Conductor

In an embodiment, a coated conductor is provided and includes a conductor and a coating on the conductor. The coating is composed of a blend of (A) the HP-LDPE and (B) HDPE. The blend is expanded to form a foam composition. The HP-LDPE may be any HP-LDPE disclosed herein. The HP-LDPE has a dissipation factor less than or equal to $1.48 \times 10^{-4}$ radian at 2.47 GHz, prior to expansion.

A "conductor," as used herein, is at least one metal wire and/or at least one metal cable. The conductor may be a single-wire or multi-wire and may be in strand form or tubular form. Nonlimiting examples of suitable conductor include silver, gold, copper, carbon, and aluminum. The conductor may also be optical fiber made from either glass or plastic.

The coated conductor may be flexible, semi-rigid, or rigid. The coating (also referred to as a "jacket" or a "sheath" or "insulation") is on the conductor or on another polymeric layer around the conductor. The coating includes the present polymeric composition. The polymeric composition may be any polymeric composition as disclosed herein. In an embodiment, the present polymeric composition is an insulation layer on the conductor.

The coating is on the conductor. As used herein, "on" includes direct contact or indirect contact between the coating and the metal conductor. "Direct contact" is a configuration whereby the coating immediately contacts the conductor, with no intervening layer(s) and/or no intervening material(s) located between the coating and the conductor. "Indirect contact" is a configuration whereby an intervening layer(s) and/or an intervening structure(s) and/or intervening material(s) is/are located between the conductor and the coating. The coating may wholly or partially cover or otherwise surround or encase the conductor. The coating may be the sole component surrounding the conductor. Alternatively, the coating may be one layer of a multilayer jacket or sheath encasing the conductor. The primary purpose of the intervening layer is to enhance the adhesion between the coating and the conductor.

In an embodiment, the blend of (A) HP-LDPE and (B) HDPE present in the foam composition of the coated conductor has a dissipation factor, prior to expansion, of less than or equal to $1.0 \times 10^{-4}$ radian at 2.47 GHz.

In an embodiment, the HP-LDPE component of the blend, has, prior to expansion, one, some, all, or any combination of the following properties:
(i) a carbonyl ratio less than or equal to 0.05;
(ii) a hydroxyl ratio less than or equal to 0.37;
(iii) a vinylidene ratio less than or equal to 0.19;
(iv) a vinyl ratio less than or equal to 0.03; and
(v) a dissipation factor less than or equal to $1.48 \times 10^{-4}$ radian at 2.47 GHz.

Applications

The present coated conductor as described herein can be used to transmit a radio-frequency signal, either digital or analog signal. Nonlimiting examples of suitable applications include CATV cable for drop, distribution, and trunk; telephone cable; radio frequency cable for mobile telephones and two way radio; cellular telephone base stations, cable television networks, subscriber lines for telephone systems; and various other communication cables.

DEFINITIONS

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like. Typical monomers/comonomers include ethylene, butane, hexane and octene The term, "propylene-based polymer," as used herein, refers to a polymer that comprises a majority weight percent polymerized propylene monomer (based on the total amount of polymerizable monomers), and optionally may comprise at least one polymerized comonomer.

Test Methods

The carbonyl ratio, hydroxyl ratio and unsaturation contents (vinyl ratio, vinylidene ratio) are determined by Fourier Transform Infrared Spectroscopy (FTIR). Films of 10-20 mils thickness are pressed between two sheets of Teflon by heating on low (contact) pressure at 120-130° C. for 1 minute and high pressure (20000 psi) for 1 minute. The samples are removed from the press and cooled to room temperature. Collecting FTIR spectra are conducted using the following instrument and parameters:

Spectrometer: Nicolet 6700, Software: Omnic 8.1.11, Mode: Transmission, Source: IR, Detector: DTGS KBr, Number of sample scans: 64, Resolution: 4 cm$^{-1}$ The relative level of carbonyl groups are found by the ratio of the absorbances at 1722 cm$^{-1}$, to absorbance at 2019 cm$^{-1}$ (internal polyethylene (PE) thickness). The relative level of hydroxyl groups are found by the ratio of the absorbances at 1061 cm$^{-1}$, to absorbance at 2019 cm$^{-1}$ (internal polyethylene (PE) thickness). Unsaturation content (trans-vinylene, terminal vinyl and vinylidene groups) is quantified using OMNIC Peak Resolve software within FT-IR spectrometer.

Density is determined according to ASTM D 1928. Samples are pressed at 374° F. (190° C.) and 30,000 psi for three minutes, and then at 70° F. (21° C.) and 30,000 psi for one minute. Density measurements are made within one hour of sample pressing, using ASTM D792, Method B.

"Dissipation factor" is the lost energy of an applied electrical field due to internal motion of a material placed in the field. Dissipation factor is measured on 50 mil plaques at a frequency of 2.47 GHz using Agilent 8753 ES S-parameter network analyzer with compatible split post dielectric resonator. The following parameters are used in compression molding of the plaques:

5 minutes at low pressure (500 psi) and 120° C.
5 minutes at high pressure (2500 psi) and 120° C.
Water cooling to room temperature Melt Index, or $I_2$, is measured in accordance by ASTM D 1238, Condition 190° C./2.16 kg, and is reported in grams eluted per 10 minutes. The I10 is measured in accordance with ASTM D 1238, Condition 190° C./10 kg, and is reported in grams eluted per 10 minutes.

Melt strength (centi-newtons, cN) is measured with a Rheotens 71, Feeder—HCV Rheograph with the following parameters:
Parameters HCV:
Die: Round capillary
Temperature: 190° C. and 220° C.
Soak time: 4 min
Piston speed: 0.20 mm/s
Parameters Rheotens:
Acceleration: 6 mm/s$^2$
Gap between die and wheels: 100 mm
Standard wheel
Molecular Weight Distribution (MWD) and branching (LCB)—Size exclusion chromatography (Gel Permeation Chromatography-Triple detector) is used to compare molecular weight distribution of the various grades. Test conditions are:
1,2-4 trichlorobenzene as solvent
Test temperature=140° C.
Columns: G/M/M IBM
Sample size=250 μL Some embodiments of the disclosures will now be described in the following Examples.

EXAMPLES

Example 1

In a stirred three zone reaction autoclave (AC) reactor followed by a single reaction zone tubular reactor (ST), ethylene is polymerized under the steady state conditions as listed in Table 2 below. In all cases, peroxide is fed to the first autoclave zone, the second autoclave zone, and the tubular reactor section. Peroxide is fed in such a way to maintain the reactor temperature at the control temperature. The residence time for the autoclave section is approximately 30 seconds and the residence time of the tubular section is approximately 30 seconds.

Peroxide type: blend of peroxyester and dialkyl peroxide. Specifically, t-butyl peroxyacetate/t-butyl peroxyoctoate/di-t-butyl peroxide.

TABLE 2

|  | Comparative Sample 1 | Comparative Sample 2 | Example 3 | Comparative Sample 4 |
|---|---|---|---|---|
| AC Zone 1 Feed Temperature (° C.) | 27 | 27 | 18 |  |
| AC Zone 1 Control Temperature (° C.) | 260 | 260 | 239 |  |
| AC Zone 2 Feed Temperature (° C.) | 24 | 24 | 12 |  |
| AC Zone 2 Control Temperature (° C.) | 260 | 260 | 239 |  |
| AC Zone 3 Temperature (° C.) | 266 | 266 | 244 |  |
| ST Initiation Temperature (° C.) | 223 | 223 | 215 |  |
| ST Control Temperature (° C.) | 285 | 282 | 282 |  |
| Pressure (psig) | 24000 | 24000 | 24000 |  |
| Fresh ethylene feed rate (lbs/hr) | 76000 | 78000 | 78000 |  |
| Fresh isobutane feed rate (lbs/hr) | 30 | 80 | 155 |  |
| Purge Fraction | 0.13 | 0.26 | 0.26 |  |
| HP-LDPE production rate (lbs/hr) | 16100 | 17300 | 17300 |  |
| Fresh peroxide solution flow rate (lbs/hr) | 30 | 21 | 8.7 |  |
| Peroxide Efficiency ratio | 535 | 824 | 1990 |  |
| Vinyl (Mole/1000 Carbons) | 0.05 | 0.05 | 0.03 | 0.03 |
| Vinylidene (Mole/1000 Carbons) | 0.39 | 0.32 | 0.19 | 0.216 |
| Carbonyl Ratio | 0.15 | 0.08 | 0.05 | 0.06 |
| Hydroxyl Ratio | 0.38 | 0.38 | 0.37 | 0.37 |
| Melt Strength (cN) | 6.5 | 6.5 | 5 |  |
| Melt Index (g/10 Minutes) | 8 | 8 | 6 |  |
| Density (g/cm$^3$) | 0.918 | 0.918 | 0.922 | 0.922 |
| Dissipation Factor (Radian at 2.47 GHz) | $2.60 \times 10^{-4}$ | $2.01 \times 10^{-4}$ | $1.48 \times 10^{-4}$ | $1.71 \times 10^{-4}$ |

Comparing Example 3 to Comparative Samples 1 and 2 illustrates the impact of purging dissipative components from the recycle stream. Example 3 has a greater purge fraction (0.26) compared to comparative Sample 1 (0.13) which contributes to the low dissipation factor of Example 3 ($1.48 \times 10^{-4}$) compared to the higher dissipation factor of comparative Sample 1 ($2.60 \times 10^{-4}$). Lowering the reaction temperature increases the peroxide efficiency ratio for Example 3 (1990) compared to comparative Sample 2 (824). Lower reaction temperature and higher peroxide efficiency ratio contribute to the low dissipation factor for Example 3 ($1.48 \times 10^{-4}$) compared to comparative Sample 2 ($2.01 \times 10^{-4}$). For Example 3, the purge ratio, the lower reactor temperature, and the increased peroxide efficiency ratio all contribute to produce HP-LDPE with lower values for each of the following properties compared to comparative Sample 1 and comparative Sample 2:

Carbonyl Ratio;
Hydroxyl Ratio;
Vinyl;
Vinylidene; and
Dissipation Factor.

Comparative Sample 4 is a commercially available LDPE (density 0.922 g/cm$^3$) and has the following properties: 0.06 carbonyl ratio, 0.370 hydroxyl ratio, 0.216 vinylidene, 0.03 vinyl, and dissipation factor $1.71 \times 10^{-4}$ radian at 2.47 GHz. Example 3, produced by the present process, has 13% lower carbonyl ratio (0.05 vs. 0.06), 10% lower vinylidene ratio (0.19 v. 0.216) and 13% lower dissipation factor (1.48 v. 1.71) than conventional LDPE.

It is specifically intended that the present disclosure not limited to the embodiments and illustrations contained herein, but include modified forms of those embodiments including portions of the embodiments and combinations of elements of different embodiments as come within the scope of the following claims.

What is claimed is:

1. A process for producing a polyethylene composition comprising:

contacting, in a polymerization reactor under high pressure polymerization conditions, ethylene with a free radical initiator in the presence of a solvent to form a reactor effluent comprising a high pressure low density polyethylene (HP-LDPE) and unreacted species;

separating the unreacted species from the HP-LDPE to form a recycle stream;

purging dissipative components from the recycle stream to form a purged recycle stream;

maintaining a purge fraction from 0.18 to 0.6;

introducing the purged recycle stream into the polymerization reactor; and forming a HP-LDPE having a dissipation factor less than or equal to $1.48 \times 10^{-4}$ radian at 2.47 GHz.

2. The process of claim 1 wherein the purging comprises removing peroxide decomposition products from the recycle stream.

3. The process of claim 1 in which a peroxide efficiency ratio from 1800 to 2400 is maintained.

4. The process of claim 1 wherein the contacting occurs in the presence of a chain transfer agent that is a saturated hydrocarbon.

5. The process of claim 1 in which the contacting is performed in a first polymerization reactor at a temperature from 200° C. to 360° C.

6. The process of claim 1 in which the contacting is performed in a first polymerization reactor at a pressure from 22,000 psig to 33,000 psig.

7. The process of claim 1 in which an HP-LDPE having a carbonyl ratio less than or equal to 0.05 is formed.

8. The process of claim 1 in which an HP-LDPE having a hydroxyl ratio less than or equal to 0.37 is formed.

9. The process of claim 1 in which an HP-LDPE having a vinylidene ratio less than or equal to 0.19 is formed.

10. The process of claim 1 in which an HP-LDPE having a vinyl ratio less than or equal to 0.03 is formed.

* * * * *